(12) United States Patent
Hockley et al.

(10) Patent No.: US 11,027,492 B2
(45) Date of Patent: Jun. 8, 2021

(54) CONTROL SYSTEM AND METHOD FOR ADDITIVE MANUFACTURING

(71) Applicant: Siemens Aktiengesellschaft, Munich (DE)

(72) Inventors: Carl Hockley, Berlin (DE); Yaroslav Lebed, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 235 days.

(21) Appl. No.: 16/077,544

(22) PCT Filed: Feb. 9, 2017

(86) PCT No.: PCT/EP2017/052834
§ 371 (c)(1),
(2) Date: Aug. 13, 2018

(87) PCT Pub. No.: WO2017/174233
PCT Pub. Date: Oct. 12, 2017

(65) Prior Publication Data
US 2019/0054703 A1 Feb. 21, 2019

(30) Foreign Application Priority Data

Apr. 5, 2016 (EP) ..................... 16163785

(51) Int. Cl.
*B29C 64/393* (2017.01)
*B33Y 40/00* (2020.01)
(Continued)

(52) U.S. Cl.
CPC ............ *B29C 64/393* (2017.08); *B22F 10/00* (2021.01); *B28B 1/001* (2013.01);
(Continued)

(58) Field of Classification Search
CPC ... B29C 64/393; B29C 64/153; B29C 64/386; B29C 64/20; B29C 64/35; B33Y 10/00;
(Continued)

(56) References Cited

U.S. PATENT DOCUMENTS

2009/0045553 A1    2/2009  Weidinger et al.
2010/0161102 A1*   6/2010  Mattes .................. B33Y 50/00
                                                    700/108
(Continued)

FOREIGN PATENT DOCUMENTS

CN    102239045 A    11/2011
DE    102006023484 A1    11/2007
(Continued)

OTHER PUBLICATIONS

EP search report dated Oct. 24, 2016, for EP patent application No. 16163785.5.
(Continued)

*Primary Examiner* — Joseph S Del Sole
*Assistant Examiner* — Lawrence D. Hohenbrink, Jr.

(57) ABSTRACT

Quality control method and control system for a stock of a base material for the additive manufacture of components includes selecting a batch of a base material out of a plurality of indexed batches of the stock, wherein base material assigned to the same batch index is indicative to the quality of the respective base material, loading a quantity of base material of the selected batch into a manufacturing system, additively manufacturing the component from the base material, wherein the base material of the selected batch is exposed to manufacturing conditions in a build area and updating the batch index of the base material remaining from the additive manufacture in the build area according to the exposure.

12 Claims, 1 Drawing Sheet

(51) Int. Cl.
  *B29C 64/35* (2017.01)
  *B29C 64/386* (2017.01)
  *B22F 10/00* (2021.01)
  *B33Y 10/00* (2015.01)
  *B33Y 30/00* (2015.01)
  *B33Y 50/02* (2015.01)
  *B29C 64/153* (2017.01)
  *B29C 64/20* (2017.01)
  *B28B 1/00* (2006.01)
  *B28B 17/00* (2006.01)
  *B22F 10/10* (2021.01)

(52) U.S. Cl.
  CPC ........ *B28B 17/0081* (2013.01); *B29C 64/153* (2017.08); *B29C 64/20* (2017.08); *B29C 64/35* (2017.08); *B29C 64/386* (2017.08); *B33Y 10/00* (2014.12); *B33Y 30/00* (2014.12); *B33Y 40/00* (2014.12); *B33Y 50/02* (2014.12); *B22F 10/10* (2021.01)

(58) Field of Classification Search
  CPC ......... B33Y 30/00; B33Y 40/00; B33Y 50/02; B22F 3/008; B22F 10/10; B28B 1/001; B28B 17/0081
  USPC ........................................................ 264/308
  See application file for complete search history.

(56) References Cited

U.S. PATENT DOCUMENTS

2010/0192806 A1    8/2010  Heugel et al.
2016/0193696 A1*   7/2016  Mcfarland ............. B22F 3/008
                                                           219/76.12

FOREIGN PATENT DOCUMENTS

DE     102008060046 A1    6/2010
WO     2010083997 A2      7/2010
WO     2016207777 A1     12/2016

OTHER PUBLICATIONS

International Search Report dated May 12, 2017, for PCT/EP2017/052834.
Mattes, Thomas, "EOS International User Meeting 2008—Product News Polymere Laser-Sintering", pp. 1-36, Apr. 15, 2008, XP002590006, Retrieved from the Internet: URL:http://www.detekt.com.tw/pdf/%E6%87%89%E7%94%A8%E6%8E%A8%E5%BB%A3/%E5%A1%91%E8%86%AO%E6%87%89%E7%94%A8/Product%20News%20Polymere%20Laser-Sintering.pdf [retrieved on Jun. 30, 2010].

* cited by examiner

CONTROL SYSTEM AND METHOD FOR ADDITIVE MANUFACTURING

CROSS REFERENCE TO RELATED APPLICATIONS

This application is the US National Stage of International Application No. PCT/EP2017/052834 filed Feb. 9, 2017, and claims the benefit thereof. The International Application claims the benefit of European Application No. EP16163785 filed Apr. 5, 2016. All of the applications are incorporated by reference herein in their entirety.

FIELD OF INVENTION

The present invention relates to a quality control method of a stock of a base material for the additive manufacture of components, advantageously for a plurality of additive manufacturing jobs. Further, the present invention relates to a control system for handling and assuring the quality of a stock of base material and a facility comprising the control system. Still further, the present invention relates to a computer readable medium.

BACKGROUND OF INVENTION

Powder bed manufacturing methods such as selective laser melting or selective laser sintering are relatively well known methods for fabricating, prototyping or manufacturing parts or components from powder material, for instance. Conventional apparatuses or setups for such methods usually comprise a manufacturing or build platform on which the component is built layer-by-layer after the feeding of a layer of base material which may then be melted, e.g. by the energy of a laser beam and subsequently solidified. The layer thickness is determined by a wiper that moves, e.g. automatically, over the powder bed and removes excess material. Typical layer thicknesses amount to 20 µm or 40 µm. During the manufacture, said laser beam scans over the surface and melts the powder on selected areas which may be predetermined by a CAD-file according to the geometry of the component to be manufactured.

In the field of additive manufacturing, with respect to both, research and mass production, there is currently little known about the effects of using recycled or reused powder on the final quality of the as-manufactured component or part. Thus, there is the need for a system which allows for a reliable tracking and/or management of a base material stock, preferably a powder stock. To this effect, the present invention aims preferably at powder-bed-based manufacturing processes.

Actually, in the state-of-the-art additive manufacture it has to be coped with the huge amounts of various types of base materials which are usually present in a plurality of recycling states. This makes it generally very difficult to track the quality and manage the movement of portions of base material, which may be present in numerous containers, manufacturing systems or powder buckets of the system.

The mentioned "recycling" shall particularly pertain to base material which is or is to be used again for a manufacturing job or the buildup of the component once said material has already been present in a manufacturing space or build area or exposed to the respective manufacturing conditions such as exposure to a laser or electron beam for solidification of the base material.

Currently the effects of the mentioned manufacturing conditions on the quality or performance of the base material, such as the powder, are not very well defined and or understood, as the quality of e.g. the powder depends on various different aspects, such as e.g. laser parameters, particularly the exposure of the base material to heat in the build area. Therefore, there is the need to provide a powder control system and a quality control method. Particularly, it is an object of the present invention to provide means to enable or improve the quality assurance and/or handling the base material of during additive manufacturing research and/or industry.

SUMMARY OF INVENTION

The mentioned object is achieved by the subject-matters of the independent claims. Advantageous embodiments are subject-matter of the dependent claims.

The mentioned "components" may be any ceramic or metallic components or plastic components. Preferably, the components may pertain to components of a turbine, such as a gas turbine.

The term "additive" in the context of manufacturing shall particularly denote a layer-wise, generative and/or bottom-up manufacturing process. The additive manufacturing as described herein may be or relate to rapid prototyping.

An aspect of the present invention relates to a control system for assuring quality and/or handling a stock or inventory of the base material for an additive manufacture of a component, wherein the control system comprises a plurality of containers for retaining the base material. The control system is further configured to track or trail the base material or the location of the base material and, advantageously, its quality during a plurality of manufacturing jobs or buildup processes of the components in that the stock is or can be subdivided into a plurality of batches of the respective base material, wherein each batch comprises base material of the same quality. Preferably, the batch also holds information about the type of base material, e.g. the manufacturing line or material system. Particularly, said tracking is advantageous in order to keep a user or operator of the control system informed of the powder quality present in a corresponding manufacturing system over a large number of manufacturing jobs.

The term "batch" in particular relates to a virtual and/or physical indexing but pertaining to the physical amount of material.

In an embodiment, the base material is a powdery or granular material for the respective component.

In an embodiment, the control system is configured to provide information about a quality and/or a disposability, such as a quantity and location of the base material.

The control system comprises a processing system being connected to an operator interface or the like for receiving and processing instruction from an operator of control system and to display information to said operator. In this way, the control system and a corresponding quality control method of the stock may easily be adapted to the operator's needs and can be administered by the operator.

A further aspect of the present invention relates to a facility for additively manufacturing of a component. The facility, advantageously being configured for additively building up a plurality of user-defined components, comprises the control system as described. The facility further comprises a manufacturing system for the additive manufacture of the component(s) out of the base material, wherein the manufacturing system may include a conveyor system being configured to convey base material in and out of the build area and, advantageously also between the different containers and the manufacturing system. The conveyor system may in turn comprise wipers or pistons in order to be able to convey the base material expediently. Additionally or alternatively, the conveyor system may comprise means for conveying base material by air blasts or pressurized air.

In an embodiment, the manufacturing system comprises a plurality of build areas, e.g. for a plurality of different materials to be manufactured in a separate manufacturing line, setup or sub-system, each.

The facility can be an industrial manufacturing line for the additive manufacture of components of a plurality of different materials.

A further aspect of the present invention relates to a quality control method of a stock of the base material for the additive manufacture of components comprising selecting a batch of the base material out of a plurality of indexable or indexed batches of the stock, wherein base material assigned to or indexed with the same batch index is indicative to the quality of the respective base material. The selection is advantageously made by the user or operator of the method and/or the control system.

By means of the batch indices or batch indexing, a classification of base material of the stock may advantageously be provided.

The method further comprises loading or filling of a quantity of base material of the selected batch into the manufacturing system.

In an embodiment, said quantity is pre-defined by the user or the operator.

The method further comprises additively manufacturing or building up the component from the base material, wherein the base material of the selected batch is exposed to manufacturing conditions, such as the heat of a solidifying laser or electron beam in the build area. Most advantageously, the exposure to the manufacturing conditions pertains to the exposure to heat in the build area, as said exposure may result in a sticking or conglomeration of at least parts of the base material. Thereby, the mentioned base material is of course rendered unusable and has to be sieved or filtered before it can be recycled or re-used. Powdered base material which hasn't been hit e.g. by the laser beam and filtered advantageously still provides its nominal properties, e.g. in terms of powder fraction and/or particle size.

Additionally or alternatively, the heat of the corresponding solidifying unit, such as the laser, may cause deterioration of the powder material or oxidation which in turn affects the suitability of said base material for further manufacturing jobs in an adverse way.

In an embodiment, the base material remaining from the additive manufacture in the build area is sieved or filtered after the corresponding additive manufacture.

The method further comprises updating the batch index of the base material remaining from or after the additive manufacture in the build area according to the exposure to the manufacturing conditions. Said updating advantageously relates to an increase of the batch index by one increment.

Thereby, means are provided, by which the user or operator of the control system or as the case may be the described method is able to effectively track the desired base material portion and its quality advantageously during the whole operation of the described manufacturing system and/or facility.

By the present invention, quality control, management and/or handling of base material may be facilitated by means of the "batch-identification", as described. The batches are advantageously non-physical entities to which all of the powder of the stock belongs regardless of the physical container it is actually retained in. The method or handling system as described is particularly also useful in a software environment, wherein the batches can be used as a collective area for all of the individual base material portions of the same condition, therefore allowing an operator for much a quicker overview of the current base material situation as compared to the current practice, wherein each container has to be physically checked in the respective working area in a complicated way, before the next manufacturing job can be initialized.

The control system is configured to track the base material and its quality by means of the batch index of the base material during the plurality of manufacturing jobs.

In an embodiment, the base material and its quality are tracked in that the stock of the base material is retained in different containers which are numbered and assigned to or indexed with a batch index each. Nevertheless, it may readily be possible that base material which has been assigned to a single batch is contained in different containers, such that the batch, which is advantageously not a physical single container, consists of the base material in the different containers.

In an embodiment, the date, the respective container was filled in the current amount of base material in that container or the container weight is registered by the control system. Thereby, the tracking of the powder material within the whole facility or manufacturing system may be facilitated.

In an embodiment, the containers are indicated with a container number, and a type of base material being contained in the respective container. Accordingly, it may further be indicated if the respective container is a fresh one or a container which has already been opened or begun.

The quantity of powder to be loaded into the manufacturing system is entered manually into the control system by the user or operator.

The quantity of the base material remaining from or after the additive manufacture or the recent manufacturing job is automatically calculated by the control system, e.g. based on a position of a feed piston of a manufacturing system which is provided in the build area in order to provide the base material to the actual build area or level.

In an embodiment, prior to the loading, a filling status of the manufacturing system, or as the case may be, the different containers, is checked by the control system. Said check may further comprise the control of the amount of base material actually present in the build area, the location of the mentioned piston, thus filling status of the build area and to whether a correct a wrong batch and/or container has been selected by the operator.

In an embodiment, the control system is configured such that the control system informs the user or operator or warns him when a filling status of a container, advantageously a fresh container with a batch index of "00", is below an alarm level or a false or non-disposable batch or batch index has been selected by the user. This particular embodiment can advantageously improve quality control and handling of the base material of the whole manufacturing system or facility and improve the disposability of the base material in general.

In an embodiment the control system is configured to propose a batch of a base material for a subsequent manufacturing job to the operator. Thereby, the operator may be supported in his decision(s) concerning the proximate manufacturing job.

In an embodiment, the base material remaining from the additive manufacture is either removed from the manufacturing system and recycled, advantageously also filtered, or left inside the build area for a subsequent manufacturing job.

In an embodiment, the method is performed such that, when the base material remaining from the additive manufacture shall be removed, e.g. according to an operator decision, said base material is conveyed to a container corresponding to the updated batch index of that base material. Said container may, thereby, be a container which already comprises base material of the same batch (index).

A further aspect of the present invention relates to a, non-transitory, computer-readable medium comprising executable instructions being suitable to cause the processing system and/or the described control system to execute the following steps:—assigning batch indices to a plurality of batches of a base material for an additive manufacture of a component based on an operator selection, —updating a batch index of the selected base material once the base material has been exposed to the respective manufacturing conditions, thereby tracking the base material and its quality by means of the batch indices.

Advantages relating to the described method and/or the described computer readable medium may as well pertain to the control system and/or the facility as described.

Further features, expediencies and advantageous refinements become apparent from the following description of the exemplary embodiment in connection with the Figures.

DETAILED DESCRIPTION OF INVENTION

Figure 1:
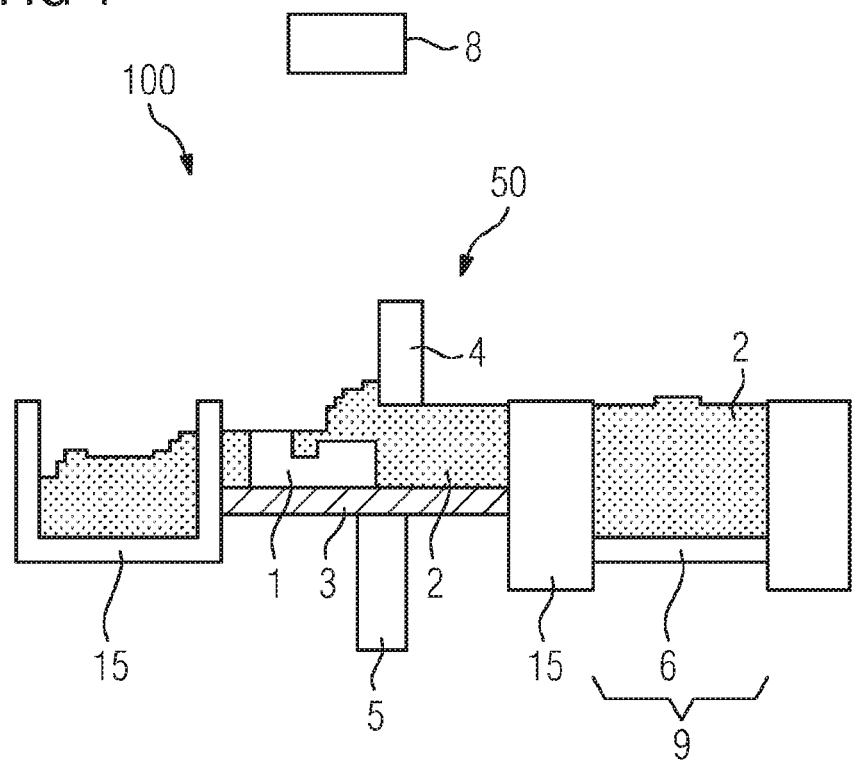
FIG. 1 shows a schematic of a manufacturing system.

Like elements, elements of the same kind and identically acting elements may be provided with the same reference numerals in the figures.

FIG. 1 shows a schematic of a manufacturing system 100. The manufacturing system 100 is advantageously a system or device for additively manufacturing of a component 1 by means of a powder bed manufacturing process, such as selective laser melting. Alternatively, the manufacturing process may be or comprise selective laser sintering and/or electron beam melting.

Accordingly, in the manufacturing system 100, the component 1 is advantageously manufactured or build up layerwise. Particularly Selective Laser Melting (SLM) is a advantageous powder-bed additive manufacturing process by which a high power laser can be used to build up a 3D part layer-by-layer for research and/or industrial applications.

The component 1 may be any user-defined or pre-defined plastic ceramic but advantageously metallic component which is to be additively manufactured in the manufacturing system 100.

Preferably, the component 1 is a turbine component, e.g. a part to be applied in gas turbines and required to withstand large temperatures. The component 1 is only depicted partly as the component shall be shown during its additive manufacture or buildup.

The manufacturing system 100 comprises a build platform 3. The build platform 3 is movable by means of a drive comprising e.g. a feed piston 5. The manufacturing system 100 further comprises base material 2 out of which the component is to be manufactured. Preferably, the base material 2 is a metal powder. The base material 2 is advantageously mainly retained in base material supply 9. The supply 9 comprises a further piston 6 for providing the base material 2. The further piston 6 is advantageously displaceable vertically in order to allow for further base material to be delivered into the build area 50.

The manufacturing system 100 further comprises a wiper, scraper or deposition unit 4 by means of which base material can be moved from the supply 9 into a build area 50 of the manufacturing system 100 (e.g. from right to left). Access powder is then advantageously directly moved into a discharge or overflow container 15 of the manufacturing system 100. The overflow container 15 is expediently arranged at a side of the build area 50 which is opposed from the location of the supply 9.

Once a layer of base material 2 has been spread in the build area, e.g. on top of the build platform 3, it is expediently melted and subsequently solidified, advantageously by means of a beam of a laser 8, which may be scanned over a surface of the component 1. Later, the feed piston 5 is advantageously lowered by a distance according to the thickness of the as-solidified layer of the component 1, e.g. by 40 μm.

At the end of a respective build job, any base material 2 in the manufacturing system 100 and around the component 1, either in the overflow container 15 or still on top of the feed piston 5 can be sucked out, e.g. with a specialized vacuum equipment (not explicitly indicated) and advantageously filtered or sieved, e.g. by a filter (not indicated). Said sieving is particularly important as—due to the exposure to the heat of a laser or electron beam of the additive manufacturing system—the base material may be partly solidified to clusters. By the sealing of filtering, said clusters—which may result from weld spattering—may be separated and the rest of the base material and its original state may be recycled.

Thereby, the quality of the expensive base material 2 can advantageously be registered and assured, which is particularly desirable in case of high-performance materials as in the case of gas turbine components. Moreover, the user or operator is given the possibility to track the quality as well as disposability of a plurality of portions or subquantities of the base material stock.

Particularly, the operator or manufacturer of the component 1 may e.g. retroactively track the quality of the powder in that the system holds and/or stores information about the source of base material or the batch index thereof even after the component has already been finished.

Selective laser melting is still a relatively juvenile technology and so the effects on the powder due to going through the process are still not fully understood. To this effect a system which allows for controlling quality as well as handling of the base material requires not only the ability to have an inventory view of what base material 2 is available but also e.g. what state the powder is in and how many times it has e.g. been exposed the process conditions of manufacturing. Further, the base material may deteriorate or lose performance over time.

According to the present invention, a batch or bucket indexing is provided by means of which base material of the same qualitative state, i.e. comprising the same a batch index, can be tracked, advantageously, over the whole lifetime of the base material 2 and/or the manufacturing system 100.

The mentioned usage of batch indices—as will be described below mainly in conjunction with FIG. 2—provide for a significant improvement over a mere cycling index, for instance. In other words, the batch index allows for the indication and tracking of all of those physical properties which are relevant for the performance of the component to be manufactured. Therefore, pertinent testing processes, e.g. including elemental analysis of the respective powder portion may be conducted on occasion.

The sole tracking of a cycle number, wherein e.g. it is only tracked how often a powder portion is moved from one container to the other is not necessarily relevant as this portion may not have been subjected to the manufacturing conditions and in this way may haven't deteriorated significantly.

Important parameters which may significantly influence the quality of a specific quantity or portion of base material 2 is the time the respective portion has been exposed to a radiation source or electron beam for solidification. In this way also the power of that radiation source may be crucial. Thus, the most crucial impact on the performance of the base material once it has been exposed to the manufacturing conditions is e.g. the heat of the laser which usually dominates oxidation behavior. The oxygen content of the powder and/or the as-manufactured component may later on be checked in a respective laboratory analysis by means of the pertinent methods. This is particularly expedient after a specific portion of base material or batch index has e.g. been exposed to the heat of the laser for 15 to 20 times.

Still further, the particle fraction or particle size distribution of the powder particles, may vary, particularly the powder particles may cluster and/or conglomerate caused by weld spattering. By the above-mentioned sieving process, which is most advantageously carried out every time the respective base material portion has been exposed to the laser heat, the clusters can be separated and the still usable share of that base material may be recycled.

These different aspects may be accounted for by the batch indexing approach of the present invention using a principle of equivalent deterioration. Particularly, it may be tested, how crucial the different aspects are and—by means of the batch indices—the quality of the powder portion may still be handled reliably. For example, if an exposure of a laser is 3 times as harmful, when a portion of the powder bed had a small distance to the laser beam, a batch index of that particular powder portion may be increased by an increment of 3 (in comparison to a powder portion having had a larger distance to the beam, for example).

Figure 2:
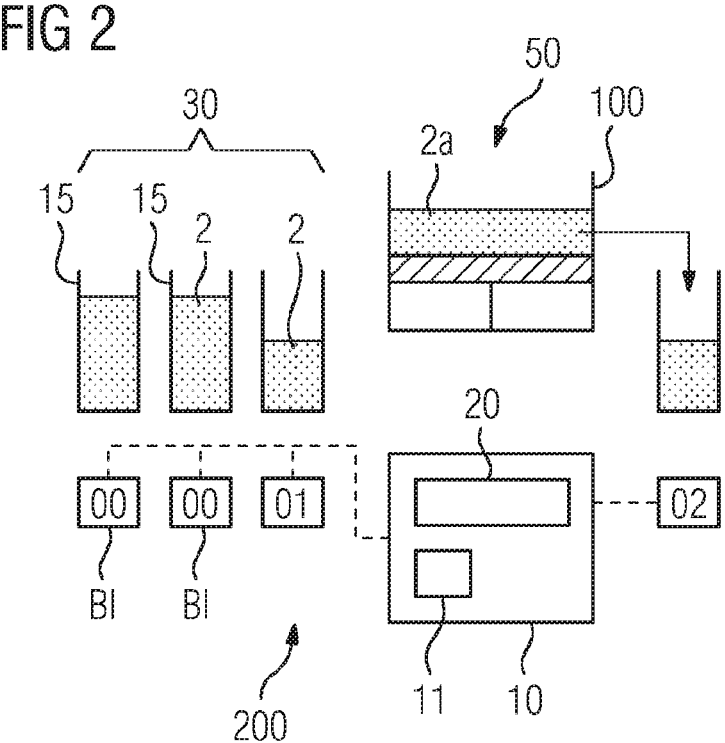
FIG. 2 shows a schematic of a facility according to the present invention.

FIG. 2 shows a schematic of a facility 200 comprising the manufacturing system 100 as described in FIG. 1. Along with a description of FIG. 2, an inventive quality control method of a stock of base material is further described.

Although this is not explicitly indicated, the facility 200 may comprise even various manufacturing systems of the type as described or at least a plurality of different material lines of additive manufacturing, wherein a plurality of different components 1 can be manufactured simultaneously in a plurality of build areas 50.

The facility 200 comprises a base material stock 30. The base material stock 30 is retained in a plurality of containers 15. Said containers 15 may be the same as the discharge or overflow container as described in FIG. 1. Preferably, said containers 15 are metallic containers, each capable of grasping e.g. 200 kg of base material and belonging to their facility equipment. Preferably, fresh base material, e.g. per chased commercially may be present in plastic containers of e.g. amount of 10 kg, which base material may then be manually filled into the containers 15. Alternatively, the containers 15 may exhibit the mentioned plastic containers.

The containers 15 may comprise a container number (not explicitly indicated). The date the respective one of the containers 15 was filled with fresh powder may as well be registered. Moreover, the type of base material or material composition may be registered or indexed as per a quality control method and the control system 10 as will be described below.

As a mere example for the material stock 30 containers 15 are shown in FIG. 2. Below the respective container 15, a schematic batch index of each of the containers is depicted. The left and the middle one of the depicted containers are assigned to a batch index BI of "00" as these containers contain fresh base material, e.g. base material which has not been used previously.

In contrast, the right container 15 of the stock 30 is not completely, but only partially filled with base material. Although this container might as well be assigned to batch index "00", it rather contains base material indexed with batch index BI of "01". The increment of 1 accounts for the fact that the respective base material has already been exposed to the manufacturing conditions in the manufacturing system 100 and a slight deterioration of 1 equivalent or increment is likely and has been assigned. Thus, this particular base material 2 may be less suitable for a proximal manufacturing job requiring base material of highest performance.

In order to manage or handle the idea of tracking the quality of the different powder portions by means of the batch indexing, a control system 10 is provided pursuant to the present invention. The control system 10 may comprise the plurality of containers 15 as described. The control system 10 is further configured to track the base material and its quality during a plurality of manufacturing jobs in that the stock 30 is subdivided into the different batches of base material (cf. above). The control system 10 further comprises a processing system 11 and a user or operator interface 20. The processing system 11 is connected to the operator interface 20 for receiving and processing instruction from an operator of the control system 10 and to display information to said operator.

Although this is not explicitly indicated, the facility 200 and/or the control system 10 may comprise a conveyor system being configured to convey base material to, e.g. between the different containers 15 and advantageously in and out of the manufacturing system 100.

According to the inventive method pertaining to the quality control or assurance of the stock 30 of base material 2, a user or operator may select a batch of base material out of a plurality of, possibly differently indexable or indexed batches of the stock 30. Actually, base material 2 with BI of "01" has been selected.

The operator may then load (either manually or by means of a respective instruction to the control system 10) a quantity of base material from the selected batch, e.g. material with BI "01", into the manufacturing system 100, more particularly to a specific build area 50 (cf. arrow) thereof.

Thus, the manufacturing job or additive manufacture of the component may be carried out from the selected base material 2. Once the component 1 has been built and finished, there will be some base material left or remaining in the manufacturing system and/or build area (excess powder) which has to be sieved and thus assigned to an updated batch index BI as it has—at least partly—been exposed to the heat of the laser 8.

In the following, the already described aspects and possibly further aspect of the present inventive concept will be described more particularly in conjunction with a software module which may be executed by the described processing system 11:

Once a manufacturing job or build-up has been entered by the operator of the control system and/or the method, a "Post-Job Clean-up" may automatically be carried out by the control system or its software via the operator interface 20 in the control system 10. Preferably, there will always be such Clean-up-process for the control system 10 to capture the status of the base material 2 left or remaining in the build area 50 on the feed piston 5, after a component has been finished.

Then, the type of material and/or the name or indication of the respective manufacturing system 100 has to be entered by the operator into the control system via the operator interface 20. Preferably, the indication of the manufacturing system must be a valid name that matches one of the values which has been accorded to the manufacturing system previously. Otherwise, an error message may be indicated in a display of operator interface 20, for example. Said indication of the manufacturing system or the respective machine name can advantageously be selected from the drop-down list implemented in the respective software.

When there is no base material left in the feed piston 5 from a previous job, a value for the "Post-Job Clean-up" is advantageously (assigned to) "0". When—on the contrary— there is base material left in the feed piston 5 from a previous job the mentioned value may e.g. as well be assigned to "0" by a user, when said remaining base material has been sucked out or removed from the machine manually.

Then, as mentioned above, the amount and/or quantity of base material to be added to the feed piston of the machine is advantageously entered by the operator.

Following the process of filling the machine feed piston 5 with powder, the user may be provided with a list of containers from which the powder came.

This list is advantageously provided by the software and provided to the operator via the control system 10.

For example, the feed piston in FIG. 5 has been filled completely with 150 kg of a base material portion 2a. This was advantageously taken from one of the containers 15 with batch index BI "00" or from a fresh (commercially available) plastic container.

As maybe a number of 15 plastic containers (cf. numeral 15) may have been completely emptied, all of the information related to them can be removed. If their contents were not being completely depleted or emptied, the operator may simply update the respective values, e.g. pertaining to the container number.

The total amount or quantity of base material in the selected batch, e.g. batch with batch index BI "00", is then advantageously automatically recalculated after the portion of base material 2a has been loaded into the build area 50.

Next this base material 2a must be allocated to the actual manufacturing job. The quantity taken from each bucket or container 15 for a manufacturing job may be entered—into an appropriate column in the interface 20 of the control system 10.

Next, the respective component 1 may be manufactured as described according to FIG. 1. Once the manufacturing job has been completed, any information for said job, as for instance a manufacturing job identification (ID) number may be generated and/or entered into the operator interface 20 by the operator.

Once a value for a height of the feed piston 5 is entered, the remaining amount of powder on the feed piston 5 in the build area 50 (remaining from or after the previous manufacture) may automatically be calculated by means of the volume or partial volume of the container or build area. This procedure is carried out following:

For each batch, a check of each machines last manufacturing job is carried out by the control system 10 to see whether that manufacturing job has already assigned to an information or value of the amount of base material remaining in the build area 50 or if an end position of the feed piston 5 has been registered. If there is no such value, a job ID may be stored. Once said value has been accorded or registered, a search for a value for the position of the feed piston 5 at the end of the job is carried out.

In the present example, after the manufacture of the component 1 (cf. FIG. 1) e.g. 30 kg of base material may remain on feed piston 5 and or in the discharge or overflow container 15.

Actually, there are two types of base material which can be removed from the respective manufacturing system 100, i.e. base material remaining from the overflow piston or container 15 along with further base material which may always be present around the build platform 3 and base material remaining from the feed piston 5.

The base material on the feed piston 5 can either be left in the machine for a subsequent manufacturing job or sucked out or off the feed piston 5. If the remaining base material is sucked out and removed, the operator will select one of the containers 15 and remove the powder from the machine or manufacturing system by any suitable means. The mentioned removal is indicated in FIG. 2 by the arrow pointing to the container 15 indexed with a BI of "02"). In other words: The quantity of base material that may have been removed from the overflow container 15, and possibly also from sites around the build platform 3, should be updated with respect to the corresponding batch index from a BI of "01" to "02", unless the expected quality deterioration of that portion or quantity of base material is even worse and the batch index BI has to be updated by an increment of even 2 or 3 units (cf. above).

In other words, due to the exposure of base material in the build area 50 and on top of the feed piston 5, said base material has to be assigned a new batch index as well as filtered or sieved. During sieving, the base material passes normally from one container 15 to another. Once the base material has been sieved, the new container should be assigned with the next batch index number and the old "unsieved" container values should be removed or updated by the software, for instance.

When the next manufacturing job on the manufacturing system 100 is aimed and entered, the base material possibly left in the machine from the previous manufacturing job may be used, wherein the software and/or the control system 10 should inform the user that this base material comprises a "used" batch index BI. Additionally or alternatively, the control system may propose a specific source of base material of any batch.

As the user is, in any case, informed about the quality or deterioration of the base material in the machine and/or the different containers of the stock 30, the operator may decide whether he wants to continue with a portion of base material with a batch index BI of "00", i.e. a fresh base material, e.g. for highest performance components or if he may manufacture the respective component with a base material of an already updated or incremented batch index BI.

In the following further aspects and/or features of the described software are described:

The software of the control system 10 may be an excel-based tool which is provided with the aim of allowing an SLM (or other powder based manufacturing) system to easily keep a track of their base material inventory as well as that one which has been used for past build jobs. Said software may be implemented with the aid of different columns and/or sheets, wherein with every selection/value change the control system 10 updates the information on the state of the manufacturing system(s) 100 as well as the base material via the sheets in order to keep the data overview up to date.

There are many features in place to guide the user through the process; such as messages when a selected manufacturing system or machine already contains base material from a certain batch. Particularly, a planning tool may be provided which will assist the operator in deciding which base material and manufacturing system is available for the intended manufacturing job.

Further, an early warning system may be provided by means of which the quantity of base material remaining in one of the containers 15 may be registered and which will provide a warning and/or conduct a purchase, if the amount of base material there in gets below an alarm level. Thereby, a (significant) machine downtime due to lack of base material can advantageously be removed or even completely avoided.

The presented control system 10 may particularly allow for the tracking of a multiplicity of differently indexable or indexed batches of base material in a plurality of additively manufacturing systems.

Furthermore, the (partial) stock 30 of each batch may be surveyed, in terms of the container number, weight of base material in the container and/or the date the container was filled, as mentioned above. Moreover, the different containers may be physically arranged or allocated in the facility 200 or corresponding areas independent of the sieved and un-sieved condition. As well, the total amount of base material in the stock 30 may be indicated to the operator via the operator interface 20.

Once a machine is assigned to a new manufacturing job, several checks may be carried out to check the state of the manufacturing system 100. The user may see a pop-up message box, for example, if the state of the system is not as required e.g. if it contains base material from a batch other than the selected one.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. A quality control method of a stock of a base material for additive manufacture of components, comprising:
    selecting a batch of a base material out of a plurality of indexed batches of the stock, wherein base material assigned to the same batch index is indicative of a quality of the respective base material,
    loading a quantity of base material of the selected batch into a manufacturing system,
    additively manufacturing a component from the base material, wherein the base material of the selected batch is exposed to manufacturing conditions in a build area, and
    increasing the batch index of the base material remaining after the additive manufacture in the build area, wherein a magnitude of the increase reflects an extent of an exposure of the base material remaining to the manufacturing conditions in the build area during the additive manufacturing of the component,
    wherein a control system tracks the base material and its quality by means of the batch index of the base material, during a plurality of manufacturing jobs,
    wherein the quantity of base material loaded into the manufacturing system is entered manually into the control system and a quantity of the base material remaining after the additive manufacture is automatically calculated by the control system, and
    wherein the base material and its quality are tracked in that the stock of the base material is retained in a plurality of containers which are numbered and assigned to a batch index each.

2. The method according to claim 1, wherein a date a respective container of the plurality of containers was filled and a current amount of base material in the respective container are registered.

3. The method according to claim 1, wherein prior to the loading, a filling status of the manufacturing system is checked by the control system.

4. The method according to claim 1, wherein the control system informs an operator when a filling status of a container of the plurality of containers is below an alarm level or a false or non-disposable batch has been selected.

5. The method according to claim 1, wherein the base material remaining from the additive manufacture in the build area is sieved.

6. The method according claim 1, wherein the base material remaining from the additive manufacture is either removed from the manufacturing system and recycled or left inside the build area for a subsequent manufacturing job.

7. The method according to claim 1, wherein, when the base material remaining from the additive manufacture shall be removed, said base material is conveyed to a container of the plurality of containers corresponding to the increased batch index of that said material.

8. A control system for a stock of a base material for an additive manufacture of a component, the control system comprising:
    a plurality of containers for retaining the base material,
    wherein the control system is configured to track the base material and its quality during the plurality of manufacturing jobs according to the method of claim 1, in that the stock is subdivided into a plurality of batches of base material, wherein each batch comprises base material of the same quality, and
    a processing system being connected to an operator interface for receiving and processing instruction from an operator of the control system and to display information to the operator.

9. A facility for additively manufacturing of a component, comprising: the control system according to claim 8, the manufacturing system for the additive manufacture of the component out of the base material, and a conveyor system configured to convey base material in and out of the build area.

10. The facility according to claim 9, further comprising: a plurality of build areas.

11. The method according to claim 1, wherein the batch index is increased by one or more units, wherein each unit represents an equivalent amount of deterioration of the base material.

12. The method according to claim 1, further comprising assigning a same batch index number to at least two batches of the plurality of indexed batches when the at least two batches comprise base material of comparable quality.

* * * * *